(No Model.)
O. O. STORLE.
REAPER.
No. 498,323. Patented May 30, 1893.
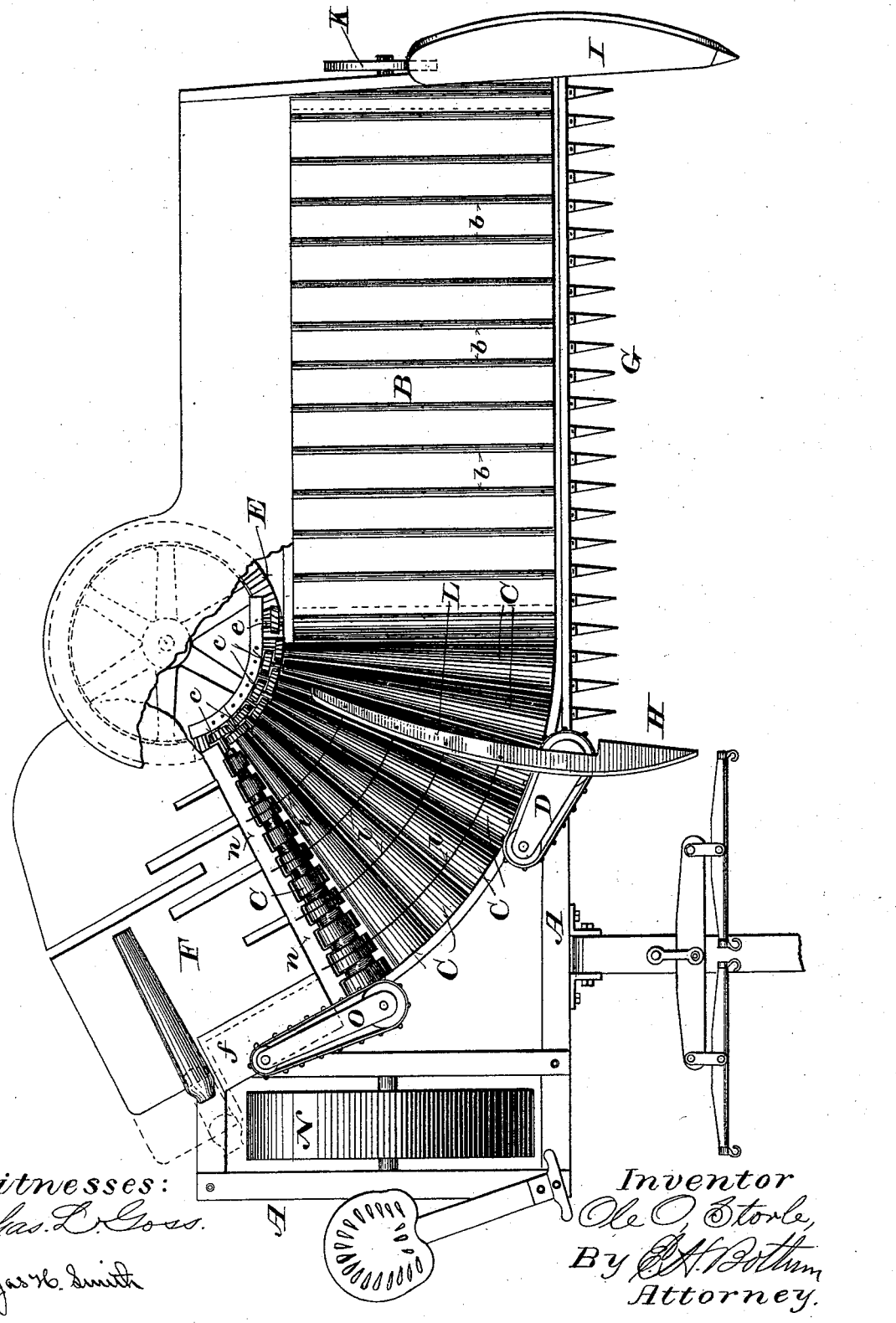
Witnesses:
Chas. L. Goss.
Jas. H. Smith.
Inventor
Ole O. Storle,
By _____
Attorney.

200
UNITED STATES PATENT OFFICE.

OLE O. STORLE, OF MILWAUKEE, WISCONSIN, ASSIGNOR TO THE WILLIAM DEERING & COMPANY, OF CHICAGO, ILLINOIS.

REAPER.

SPECIFICATION forming part of Letters Patent No. 498,323, dated May 30, 1893.

Application filed September 10, 1886. Serial No. 213,191. (No model.)

*To all whom it may concern:*

Be it known that I, OLE O. STORLE, of Milwaukee, in the county of Milwaukee and State of Wisconsin, have invented certain new and useful Improvements in Reapers; and I do hereby declare that the following is a full, clear, and exact description of the invention, which will enable others skilled in the art to which it pertains to make and use the same, reference being had to the accompanying drawing, and to the letters of reference marked thereon, which forms a part of this specification.

The objects of my invention are,—first, to produce a light, compact, simple, durable, and easy running machine; and second, to obviate the necessity for elevating the grain over the driving wheel. These objects I attain by the construction, arrangement, and combinations of parts hereinafter described and claimed.

The accompanying drawing represents a plan view of my machine.

A A is the frame work of the machine, N the driving wheel, K the grain wheel supporting the machine at the opposite end in the same axial line with said driving wheel, G the cutter bar and I the outer divider point, all constructed and arranged in the usual manner.

B is a canvas apron or carrier, provided with transverse slats *b b*, and mounted just behind and parallel with the cutter bar G upon rollers, the upper half of said carrier being arranged to travel toward the driving wheel N and catch the grain as it falls from the scythe and deliver the same at its inner end to the curved conveyer composed of a series of conical or frustum shaped rollers C C placed side by side and rotated in the same direction with said carrier. The last roller C is circumferentially grooved, as shown in the drawing, and a strip *n* provided with projections working in the grooves of said roller, is interposed between it and the binder table F so as to clear the grain from said roller as it is brought to said table. The shafts of the rollers C C, journaled in suitable bearings at each end of said rollers, are extended at the rear of the machine and provided with beveled gears *c c*, each of which works with the beveled gear E, connected with and driven from any suitable part of the machine. To secure lightness the rollers C C are preferably formed of sheet metal into which ribs or grooves may be pressed. They may, however, be formed of wood or any other suitable material. The number and size of the rollers C C may be varied, as desired, according to the curve described by the conveyer.

D is a butter driven in any suitable manner and located, as shown in the drawing, so as to even up the butts of the grain as it passes around the curve described by the rollers C C. Another butter O is employed at the discharging end of said curved conveyer to even up the grain and in connection with the packers to deliver it upon the binder table F in the proper position to be operated upon by the binder. The inside divider point H is formed with a rearwardly projecting extension or guide L inclined at its rear end toward the grain wheel K and overhanging the curved conveyer and arranged to prevent the grain as it is cut from falling crosswise of that on said curved conveyer.

*l l* are guards made of any suitable material and attached to the guide L, and extending over the curved conveyer to the binder table for the purpose of straightening the grain and retaining it in place upon said conveyer. To permit of the adjustment of the binder for grain of different lengths the table F is cut away at one end as shown by dotted lines in the drawing to clear the driving wheel N and the opening thus formed is closed by the stationary leaf *f* set sufficiently above it to allow said table to pass under the same when moved toward the driving wheel.

The operation of my improved device and the advantages resulting therefrom will be apparent to those familiar with machines of this class from the drawing and the foregoing description.

I claim—

1. The combination in a reaper with the driving wheel, cutter bar and straight conveyer working behind and parallel with said cutter bar, of a curved conveyer composed of a series of tapering rollers placed close together side by side between the inner end of said straight conveyer, the binding table and the driving wheel, a guide extending rearwardly from a point at or near the inner end of said cutter bar, laterally curved guards attached to said guide and extending over said curved conveyer toward its discharging end and a binding table with binding mechanism located at or near the delivery end of said conveyer, substantially as and for the purposes set forth.

2. The combination in a reaper with the driving wheel, cutter bar and a straight conveyer working behind and parallel with said cutter bar, of a curved conveyer located between the inner end of said straight conveyer and said driving wheel in the same plane or nearly the same plane with said straight conveyer, a guide extending rearwardly from a point at or near the inner end of said cutter bar and a guard projecting laterally from said guide over said curved conveyer, substantially as and for the purposes set forth.

3. The combination in a reaper with the driving wheel, cutter bar and a straight conveyer working behind and parallel with said cutter bar, of a curved conveyer composed of a series of tapering rollers placed side by side between the inner end of said straight conveyer and the driving wheel in the same plane or nearly the same plane with said straight conveyer, a circumferentially grooved roller at the discharging end of said curved conveyer, fixed projections extending into the grooves of said roller, mechanism connected with and arranged to rotate said rollers simultaneously in the same direction, and a binding table located at the delivery end of said curved conveyer transversely to the direction of the travel of the reaper, substantially as and for the purposes set forth.

4. The combination in a reaper of the binder table adjustable transversely to the adjacent end of the conveyer and cut away at one end to clear the driving wheel, a stationary leaf arranged to close the opening thus formed in said binder table and a curved conveyer arranged to conduct and deliver the grain upon said binder table, substantially as and for the purposes set forth.

In testimony that I claim the foregoing as my own I affix my signature in presence of two witnesses.

OLE O. STORLE.

Witnesses:
CHAS. L. GOSS,
GEORGE M. GOLL.